April 19, 1927.  1,625,536
G. GRONNER
SWIVEL PIPE JOINT
Filed May 24, 1924
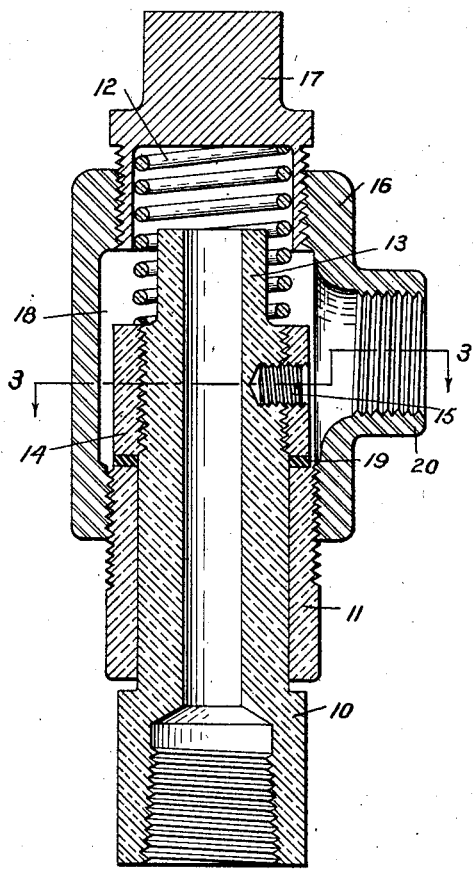
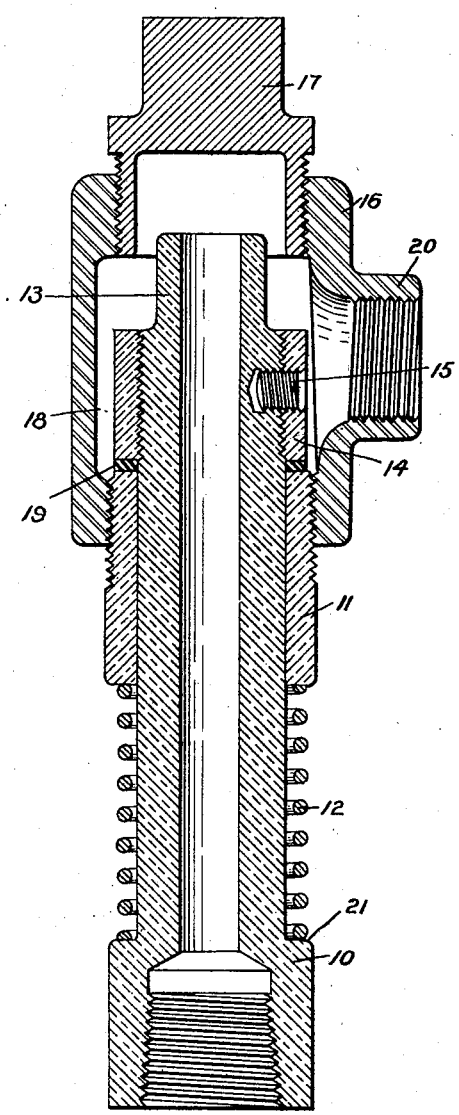
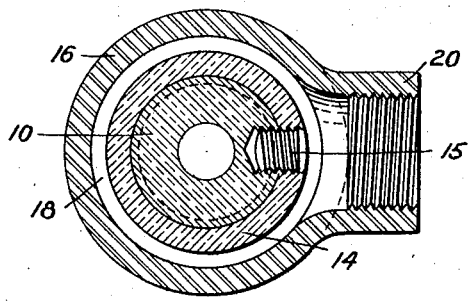
Inventor
George Gronner
By W. N. Roach.
Attorney Patented Apr. 19, 1927.

1,625,536

UNITED STATES PATENT OFFICE.

GEORGE GRONNER, OF DAVENPORT, IOWA.

SWIVEL PIPE JOINT.

Application filed May 24, 1924. Serial No. 715,711.

(GRANTED UNDER THE ACT OF MARCH 3, 1883; 22 STAT. L. 625.)

The invention described herein may be used by the Government, or any of its officers or employees in prosecution of work for the Government, or by any other person in the United States, without payment to me of any royalty thereon, in accordance with the act of March 3, 1883.

The subject of this invention is a swivel pipe joint.

In machines for drilling or reaming a cooling or lubricating flue is conducted under pressure to a cutting tool, which is either fixed to a revolving spindle on the machine or supported at the tail stock when the work to be drilled or cut is mounted on the revolving spindle. Machines of this class are provided with a safety mechanism, which releases the tool from a clamping device when it becomes caught in the work.

My invention resides in the provision of a swivel pipe joint for conducting liquid from a stationary part of a machine such as a lathe to a revolving part, which may revolve with the spindle or released tool without destruction of the piping, escape of the cooling or lubricating fluid, or diminution of pressure. I, also, provide means located within or without the assembly for preserving the tightness of the joint when the fluid pressure is relieved.

To these and other ends, my invention consists in the construction, arrangement, and combination of elements described hereinafter and pointed out in the claim forming a part of this specification.

A practical embodiment of my invention is illustrated in the accompanying drawing, in which, Fig. 1 is a longitudinal sectional view of my improved swivel joint, showing the spring within the assembly;

Fig. 2 is a similar view, showing the spring exterior to the assembly; and

Fig. 3 is a sectional view taken on the line 3—3 of Fig. 1.

Referring to the drawings by numerals of reference:

10 indicates a fluid conducting member, specifically a rotatable tubular member, which is counterbored and tapped at one end for attachment to the revolving spindle of a lathe when the work to be cut is held stationary, or it may be attached to the cutting or drilling tool when the work is mounted on the revolving spindle. The tubular member is reciprocally and rotatably mounted in a bearing 11, but is normally held against reciprocation by means of a spring 12 embracing a reduced terminus 13 of the tubular member and seated on the tubular member and a collar 14 threadedly mounted on the tubular member and secured against rotation by a set screw 15.

The bearing 11 is in threaded engagement with one end of a fluid receiving member, specifically a tapped T-fitting 16, the opposite end of which fitting is closed by a plug 17 which is recessed to form a seat and guide for the spring 12. The portion of the tubular member carrying the collar 14 is disposed within the T-fitting 16, the collar preventing withdrawal of the sleeve, and both members being spaced from the walls of the T-fitting to form a liquid receiving chamber 18. A packing ring 19, specifically a leather washer, embraces the tubular member 10 and is interposed between the collar 14 and the bearing 11, where it is held under compression of the spring 12.

The T-fitting 16 is provided with a boss 20 tapped for attachment to a stationary part of a machine (not shown) containing a liquid supply under pressure.

In the modified form shown in Fig. 2 the spring 12 embraces the tubular member 10 exterior to the assembly and is confined between a shoulder 21 formed on the tubular member and the bearing 11.

The cooling or lubricating fluid enters the chamber 18, through the boss 20 and passes through the tubular member 10 to the cutting or drilling tool. The pressure of the fluid exerted against the tubular member 10 and collar 14 will normally maintain a tight joint with the bearing 11, but when the fluid pressure is diminished or entirely cut off the spring 12 will prevent inward movement of the tubular member and maintain the closure. The tubular member 10, which is fixed to the revolving spindle or the tool, is free to rotate with such element without permitting the escape of the fluid and the consequent loss in the pressure.

While in the foregoing there has been illustrated and described such combination and arrangement of elements as constitute the preferred embodiment of my invention. It is nevertheless desired to emphasize the fact that interpretation of the invention should only be conclusive when made in the light of the subjoined claim.

I claim:

A swivel pipe joint embodying a T-fitting, a plug for closing one end thereof, said plug formed with a recess, a bearing engaged in the opposite end of the fitting, a tubular member partially inserted within the T-fitting, said tubular member formed with a reduced terminus spaced from the fitting, a collar carried by the tubular member adjacent the terminus and spaced from the fitting, a set screw uniting the collar and the tubular member, a packing ring interposed between the collar and the bearing, and a spring seated in the plug and engaging the collar to compress the packing ring.

GEORGE GRONNER.